US012656537B2

(12) United States Patent
Tao et al.

(10) Patent No.: US 12,656,537 B2
(45) Date of Patent: Jun. 16, 2026

(54) OPTICAL ELEMENT AND OPTICAL MODULE

(71) Applicant: Zhejiang Crystal-Optech Co., Ltd., Taizhou (CN)

(72) Inventors: Huan Tao, Taizhou (CN); Weiming Wu, Taizhou (CN); Fenglei Liu, Taizhou (CN)

(73) Assignee: Zhejiang Crystal-Optech Co., Ltd., Taizhou (CN)

( * ) Notice: Subject to any disclaimer, the term of this patent is extended or adjusted under 35 U.S.C. 154(b) by 302 days.

(21) Appl. No.: 18/286,581

(22) PCT Filed: Dec. 29, 2021

(86) PCT No.: PCT/CN2021/142525
§ 371 (c)(1),
(2) Date: Oct. 12, 2023

(87) PCT Pub. No.: WO2022/217976
PCT Pub. Date: Oct. 20, 2022

(65) Prior Publication Data
US 2024/0201423 A1     Jun. 20, 2024

(30) Foreign Application Priority Data

Apr. 12, 2021     (CN) .......................... 202110391636.3

(51) Int. Cl.
*G02B 3/00* (2006.01)
*G02B 3/08* (2006.01)
(Continued)

(52) U.S. Cl.
CPC ......... *G02B 3/0062* (2013.01); *G02B 3/0043* (2013.01); *G02B 3/08* (2013.01);
(Continued)

(58) Field of Classification Search
CPC ....... G02B 5/02–5/0294; G02B 3/0043; G02B 3/08; G03B 21/56–21/625; F21V 5/045
(Continued)

(56) References Cited

U.S. PATENT DOCUMENTS 2,273,801 A * 2/1942 Landis ................. H04N 9/3141
                                                        348/E5.143
2,510,344 A * 6/1950 Law ..................... G03B 21/625
                                                        359/457
(Continued)

FOREIGN PATENT DOCUMENTS

CN          1591169 A     3/2005
CN          203786454 U * 8/2014 ............. G03B 21/20
(Continued)

OTHER PUBLICATIONS

International Search Report and Written Opinion mailed Mar. 22, 2022 for International Application No. PCT/CN2021/142525.
(Continued)

*Primary Examiner* — Zachary W Wilkes
(74) *Attorney, Agent, or Firm* — Wolf, Greenfield & Sacks, P.C.

(57)     ABSTRACT

An optical element (100) and an optical module (200) are provided. The optical element (100) comprises a transparent substrate (110), an array microlens layer (120) and a Fresnel lens layer (130). The array microlens layer (120) and the Fresnel lens layer (130) are stacked on the transparent substrate (110), or the array microlens layer (120) and the Fresnel lens layer (130) are respectively located on two opposite sides of the transparent substrate (110), wherein the Fresnel lens layer (130) is used for adjusting an emergent angle of an incident light beam, and the array microlens layer (120) is used for homogenizing a light beam emitted by the Fresnel lens layer (130).

18 Claims, 5 Drawing Sheets

100

(51) Int. Cl.
    *G02B 5/02*         (2006.01)
    *G02B 27/09*      (2006.01)
(52) U.S. Cl.
    CPC ....... *G02B 5/0215* (2013.01); *G02B 27/0927*
             (2013.01); *G02B 27/0961* (2013.01)
(58) Field of Classification Search
    USPC ......................................... 359/742, 619–626
    See application file for complete search history.

(56)            References Cited

U.S. PATENT DOCUMENTS

| | | | | |
|---|---|---|---|---|
| 3,754,811 | A * | 8/1973 | Hoadley | G03B 21/625 |
| | | | | 359/457 |
| 4,053,208 | A * | 10/1977 | Kato | G03B 21/625 |
| | | | | 362/330 |
| 4,859,043 | A * | 8/1989 | Carel | F21V 5/045 |
| | | | | 359/742 |
| 5,260,828 | A * | 11/1993 | Londono | G02B 27/0025 |
| | | | | 359/569 |
| 6,636,363 | B2 * | 10/2003 | Kaminsky | G02B 5/0221 |
| | | | | 349/95 |
| 6,700,702 | B2 * | 3/2004 | Sales | G02B 3/0043 |
| | | | | 359/443 |
| 6,947,212 | B2 * | 9/2005 | Karasawa | G03B 21/10 |
| | | | | 348/E5.143 |
| 7,113,333 | B2 * | 9/2006 | Kamijima | G02B 3/0068 |
| | | | | 359/449 |
| 2002/0145797 | A1 * | 10/2002 | Sales | G02B 3/0056 |
| | | | | 359/456 |
| 2004/0070845 | A1 * | 4/2004 | Karasawa | G03B 21/10 |
| | | | | 348/E5.143 |
| 2005/0078367 | A1 | 4/2005 | Kamijima | |
| 2014/0000710 | A1 * | 1/2014 | Nakahara | G02B 5/0231 |
| | | | | 359/619 |
| 2015/0377450 | A1 * | 12/2015 | Suh | G02B 3/0043 |
| | | | | 362/319 |

FOREIGN PATENT DOCUMENTS

| | | | | |
|---|---|---|---|---|
| CN | 203836849 U | 9/2014 | | |
| CN | 107861253 A | 3/2018 | | |
| CN | 109827149 A | 5/2019 | | |
| CN | 210771965 U | 6/2020 | | |
| CN | 211426953 U | 9/2020 | | |
| CN | 111856631 A | 10/2020 | | |
| CN | 112946790 A | 6/2021 | | |
| CN | 214409365 U | 10/2021 | | |
| JP | H04329503 A | * | 11/1992 | ............... G02B 3/08 |
| JP | 2007-171561 A | 7/2007 | | |
| JP | 2008-033097 A | 2/2008 | | |

OTHER PUBLICATIONS

Chinese First Office Action dated Aug. 26, 2024 in connection with Chinese Application No. 202110391636.3.

Chinese Second Office Action dated Feb. 28, 2025 in connection with Chinese Application No. 202110391636.3.

Chinese Notice of Allowance for Invention Patent dated Mar. 31, 2025 in connection with Chinese Application No. 202110391636.3.

* cited by examiner

100

120

Radiation intensity (W/Sr)

X (°)

Radiation intensity (W/Sr)

OPTICAL ELEMENT AND OPTICAL MODULE

CROSS-REFERENCE TO RELATED APPLICATIONS

This application is a 35 U.S.C. § 371 National Phase filing of International Application No. PCT/CN2021/142525, filed on Dec. 29, 2021, entitled "OPTICAL ELEMENT AND OPTICAL MODULE," which claims priority to and the benefit of Chinese Patent Application No. 202110391636.3, filed on Apr. 12, 2021 with the China National Intellectual Property Administration, and entitled "Optical Element and Optical Module." The contents of these applications are incorporated herein by reference in their entirety.

TECHNICAL FIELD

The present disclosure relates to the technical field of optics, and in particular to an optical element and an optical module.

BACKGROUND ART

In most optical systems, it is generally required to adjust the divergence angle and intensity distribution of the light beam for a light emerged by a light source. When adjusting the light beam emerged by the light source, the collimating lens is generally used to collimate the light beam with a relatively large divergence angle into the light with a relatively small divergence angle, and the microlens array is generally used to shape the light beam into a specific intensity distribution.

In the related art, in the application of light beam adjustment and shaping, the microlens array often causes diffraction fringes in the shaped light spot due to the interference and diffraction of lens cells. On the other hand, a light beam shaping effect of the microlens is generally affected by the divergence angle and intensity distribution of the incident light, and the effect is poor at a relatively large incident divergence angle. Moreover, when adjusting and shaping the light beam, multiple groups of optical elements are required to cooperate, this increases the occupied space and is not beneficial to the miniaturization of products.

SUMMARY

The present disclosure provides an optical element and an optical module, which is capable of adjusting the light beam direction and light intensity distribution, and reducing the occupied space.

Some embodiments of the present disclosure provide an optical element, which may include a transparent substrate, an array microlens layer, and a Fresnel lens layer, wherein the array microlens layer and the Fresnel lens layer are stacked on the transparent substrate, or the array microlens layer and the Fresnel lens layer are respectively located on two opposite sides of the transparent substrate, wherein the Fresnel lens layer is configured for adjusting an emergent angle of an incident light beam, and the array microlens layer is configured for homogenizing the light beam emerged from the Fresnel lens layer.

Optionally, the array microlens layer is implemented by combining laser direct writing and embossing, or the array microlens layer is implemented by combining mask lithography and melting.

Optionally, the Fresnel lens layer is made by combining mask lithography and etching, or by combining mask lithography and embossing, or by combining laser direct writing and embossing.

Optionally, the array microlens layer includes microlenses distributed along a same plane, and the microlenses at different positions have different shapes and sizes.

Optionally, a light transmission surface of the microlens includes any one of a concave surface, a convex surface, or a wavy curved surface.

Optionally, adjacent microlenses are closely attached, and spacings between geometric centers of the adjacent microlenses are 1 um to 200 um.

Optionally, a height of the microlens is 1 um to 100 um.

Optionally, when the array microlens layer and the Fresnel lens layer are stacked on the transparent substrate, a difference between a refractive index $n_1$ of the array microlens layer and a refractive index $n_2$ of the Fresnel lens layer satisfies $|n_1 - n_2| \geq 0.2$.

Optionally, a spacer layer is further arranged between the array microlens layer and the Fresnel lens layer, a difference between the refractive index $n_1$ of the array microlens layer and a refractive index $n_3$ of the spacer layer satisfies $|n_1 - n_3| \geq 0.2$, and a difference between the refractive index $n_2$ of the Fresnel lens layer and the refractive index $n_3$ of the spacer layer satisfies $|n_2 - n_3| \geq 0.2$.

Optionally, the Fresnel lens layer includes a stepped Fresnel structure with a height $h_1$ of 0.1 um to 10 um, or the Fresnel lens layer includes a continuous Fresnel structure with a height $h_2$ of 1 um to 100 um.

Optionally, materials of the transparent substrate, the array microlens layer, and the Fresnel lens layer include any one of glass, resin, or plastic.

Optionally, a thickness of the transparent substrate is 0.1 mm to 5 mm.

Other embodiments of the present disclosure provide an optical module, which may include the optical element according to any one of the embodiments of the present disclosure, and a light emitting module, wherein the optical element is located on an emergent light path of the light emitting module.

Optionally, the light emitting module is a single light source, or the light emitting module is a module consisting of: a light source; and a lens, a mirror, or an aperture.

The beneficial effects of the embodiments of the present disclosure at least include:

By using the optical element and optical module provided by the embodiments of the present disclosure, the light beam can be collimated through the Fresnel lens layer or emerged at a specific angle, so that the direction of the light beam can be flexibly adjusted as required. After the light beam is emerged from the Fresnel lens layer, it is shaped and homogenized by the array microlens layer, and it is less affected by the coherence of the light beam, which is beneficial to improving the quality of the light beam emerged from the optical element. By combining the Fresnel lens layer and the array microlens layer, the functions of adjusting the light beam direction and adjusting the light intensity distribution can be implemented at the same time, thus improving the light beam adjustment ability and occupying less space, which is beneficial to the miniaturization of an optical module.

BRIEF DESCRIPTION OF DRAWINGS

In order to illustrate the technical solutions of the embodiments of the present disclosure more clearly, the following drawings that need to be used in the embodiments will be briefly introduced. It is to be understood that the following drawings only show some embodiments of the present disclosure, so they shall not be regarded as limiting the scope. For those ordinarily skilled in the art, other relevant drawings may be obtained according to these drawings without creative efforts.

Figure 1:
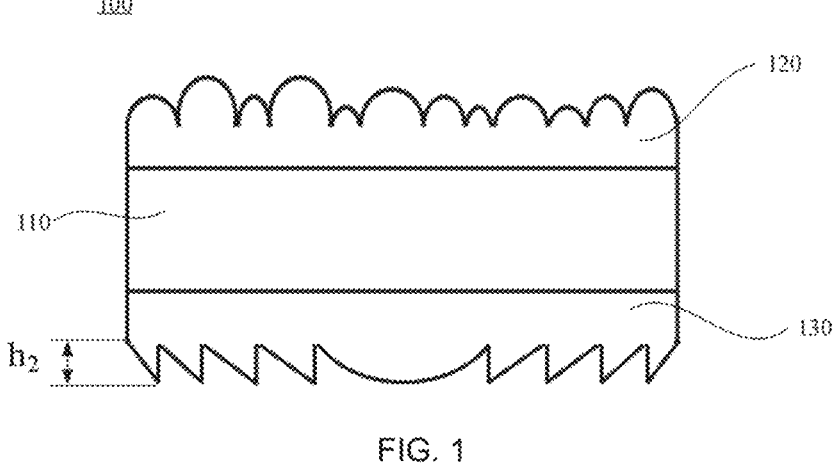
FIG. 1 is a first structural schematic diagram of an optical element provided by an embodiment of the present disclosure.

Reference numerals: 100—optical element; 105—light source; 110—transparent substrate; 120—array microlens layer; 122—microlens; 130—Fresnel lens layer; 140—spacer layer; 200—optical module; 210—light emitting module.

DETAILED DESCRIPTION OF EMBODIMENTS

In order to make the objectives, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are some rather than all of the embodiments of the present disclosure. Generally, the components of the embodiments of the present disclosure described and illustrated in the drawings herein may be arranged and designed in various different configurations.

Therefore, the following detailed description of the embodiments of the present disclosure provided in the drawings is not intended to limit the claimed scope of protection of the present disclosure, but only represents selected embodiments of the present disclosure. Based on the embodiments of the present disclosure, all other embodiment obtained by a person ordinarily skilled in the art without making creative efforts shall fall within the scope of protection of the present disclosure.

It should be noted that similar reference numerals and letters indicate similar items in the accompanying drawings, so once a certain item is defined in one drawing, it does not need to be further defined and described in subsequent drawings.

In the description of the present disclosure, it should be noted that the terms "set" and "connect" should be broadly understood, for example, they may mean fixed connection, detachable connection or integrated connection, and may mean direct connection, or indirect connection through an intermediate medium, or internal communication between two elements. For those ordinarily skilled in the art, the specific meanings of the above terms in the present disclosure can be understood according to the specific circumstances.

Figure 2:
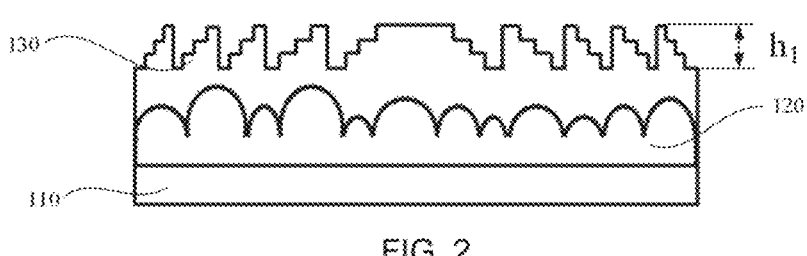
FIG. 2 is a second structural schematic diagram of an optical element provided by an embodiment of the present disclosure.
Figure 3:
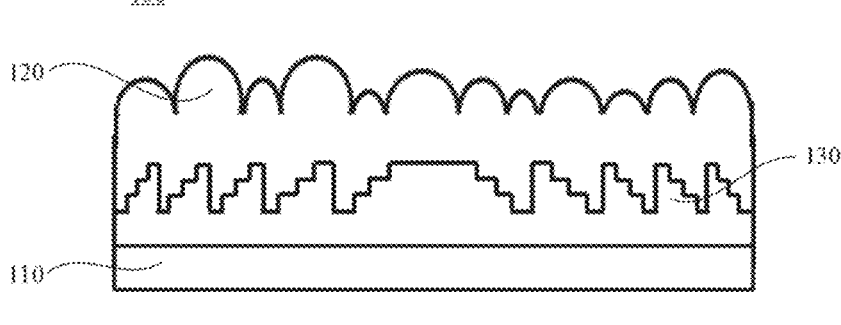
FIG. 3 is a third structural schematic diagram of an optical element provided by an embodiment of the present disclosure.

Please refer to FIGS. 1, 2 and 3, an embodiment of the present disclosure provides an optical element 100, which includes a transparent substrate 110, an array microlens layer 120 and a Fresnel lens layer 130, wherein the array microlens layer 120 and the Fresnel lens layer 130 are stacked on the transparent substrate 110, or the array microlens layer 120 and the Fresnel lens layer 130 are respectively located at two opposite sides of the transparent substrate 110, wherein the Fresnel lens layer 130 is configured for adjusting an emergent angle of an incident light beam, and the array microlens layer 120 is configured for homogenizing the light beam emerged from the Fresnel lens layer 130.

Specifically, the Fresnel lens layer 130 is configured for adjusting the emergent angle of the incident light beam, including not only collimating the light beam to make it emerge in parallel, but also flexibly adjusting the emergent direction of the light beam to make it emerge at a specific angle. In practical application, a light source 105 of the light incident the Fresnel lens layer 130 is not a simple point light source 105 or a surface light source 105. For example, the light from the light source 105 passes through the lens imaging system and then irradiates the Fresnel lens layer 130. The above method may lead to an irregular distribution of the incident angle and position relationship of the main light, at different positions of the Fresnel lens layer 130. At this point, the structural form of the Fresnel lens layer 130 can still be set according to the incident angle of the main light, so that the light beam can be emerged in parallel, or the light beam can be emerged at a specific angle as required, so as to achieve the required shaping effect.

After passing through the Fresnel lens layer 130, the light beam is incident on the array microlens layer 120, so as to homogenize the light beam emerged from the Fresnel lens layer 130. Herein, the array microlens layer 120 is an array of random microlenses 122, which can avoid the problem that diffraction cannot be well eliminated due to adoption of a periodic structure.

In addition, the array microlens layer 120 can be implemented by combining laser direct writing and embossing, or by combining mask lithography and melting. It can be understood that the Fresnel lens layer 130 can be made by combining mask lithography and etching, mask lithography and embossing, or laser direct writing and embossing. By adopting the above method, the optical element 100 has an integrated structure, which is beneficial to improving the stability of the structure and reducing the occupied space compared with a discrete optical module. The alignment accuracy of the Fresnel lens layer 130 and the array microlens layer 120 can be increased by adding an alignment mark.

As shown in FIGS. 2 and 3, when the array microlens layer 120 and the Fresnel lens layer 130 are stacked on the transparent substrate 110, the array microlens layer 120 can be in contact with the transparent substrate 110, or the Fresnel lens layer 130 can be in contact with the transparent substrate 110, which is not specifically limited in the embodiments of the present disclosure. In practical application, it is only required to make the light beam pass through the Fresnel lens layer 130 first.

In the optical element 100 provided by the embodiment of the present disclosure, the light beam can be collimated through the Fresnel lens layer 130 or emerged at a specific angle, so that the direction of the light beam can be flexibly adjusted as required. After emerged from the Fresnel lens layer 130, the light beam is shaped and homogenized by the array microlens layer 120, and is less affected by the coherence of the light beam, which is beneficial to improving the quality of the light beam emerged from the optical element 100. By combining the Fresnel lens layer 130 and the array microlens layer 120, the functions of adjusting the light beam direction and adjusting the light intensity distribution can be implemented at the same time, thus improving the light beam adjustment ability, occupying less space, which is beneficial to the miniaturization of an optical module 200 (such as a TOF emitting terminal, a laser projection module, etc.).

Figure 5:
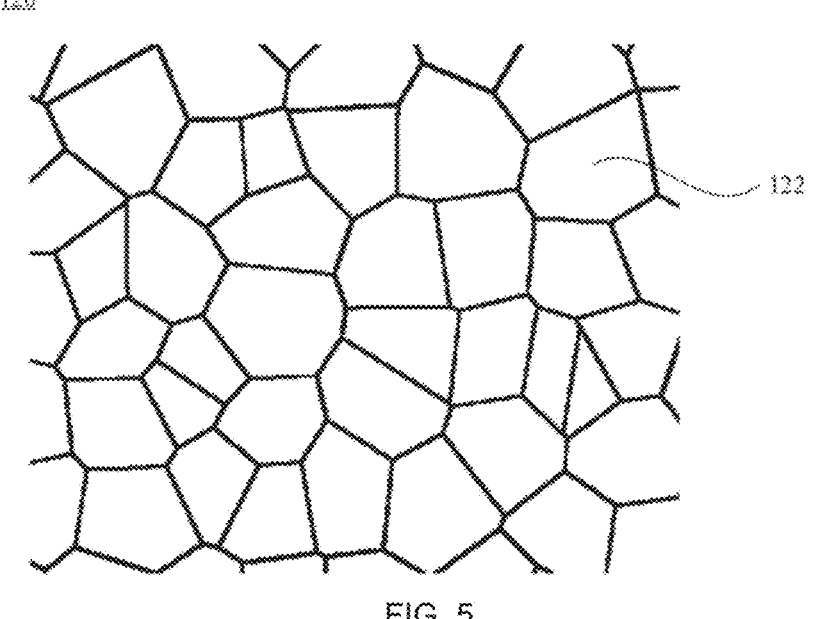
FIG. 5 is a structural schematic diagram of an array microlens layer provided by an embodiment of the present disclosure.

As shown in FIG. 5, the array microlens layer 120 includes microlenses 122 distributed along a same plane, and the shapes and sizes of the microlenses 122 at different positions are different.

Specifically, the microlenses 122 in the embodiment of the present disclosure are random microlenses 122, that is, the parameters of the microlenses 122 at different positions are different. For example, the lens height, lens diameter, lens curvature, lens pitch, etc. of the microlenses 122 can be flexibly set as required. In other words, the microlenses 122 at different positions have different shapes and sizes, so as to reduce the coherence of the light beam to a certain extent, thereby reducing the speckle effect, maintaining the required shape and uniformity at a specific distance, and further improving the light spot quality after shaping. It should be noted that the array form and specific parameters of the microlenses 122 can be flexibly set as actual needs. In practical application, different design parameters can be determined according to different selection of the size of the optical element 100, the divergence angle of the emergent light beam, and the final required divergence angle of the emergent light beam.

In an optional embodiment of the present disclosure, a light transmission surface of the microlenses 122 includes any one of a concave surface, a convex surface, or a wavy curved surface.

Specifically, the light transmission surfaces of the microlenses 122 can all adopt a concave structure, that is, be concave lenses; they may also all adopt a convex structure, that is, be convex lenses; and they may also adopt a wavy curved surface, so as to achieve different optical performances. It can be understood that the light transmission surfaces of the microlenses 122 can also be in the form of a combination of a concave surface, a convex surface, or a wavy curved surface, as long as the required light uniformity effect can be ensured, which is not specifically limited in the embodiments of the present disclosure.

As shown in FIG. 5, in an optional embodiment of the present disclosure, adjacent microlenses 122 are closely attached to each other, and spacings between the geometric centers of adjacent microlenses 122 are 1 um to 200 um.

Specifically, since the adjacent microlenses 122 are closely attached to each other and there is no gap, in order to make the adjacent microlenses 122 have no overlapping part therebetween, the microlenses 122 have irregular boundary shapes, and when the light beam passes through the microlenses 122, the purpose of light uniformity is achieved by difference of parameters between different microlenses 122. In addition, by adopting the above arrangement, the array microlens layer 120 has a structure with no gap, which is beneficial to avoiding the light leakage problem caused by the spacings between the microlenses 122, and is beneficial to improving the light uniformity performance of the optical element 100 during use. According to the different parameters of different microlenses 122, the spacings between the geometric centers of adjacent microlenses 122 are also different. In order to ensure the light uniformity quality of the light beam, in a preferred embodiment of the present disclosure, the spacings between the geometric centers of adjacent microlenses 122 are 1 um to 200 um, for example, the spacings between the geometric centers of adjacent microlenses 122 can be set to 1 um, 50 um, 100 um or 200 um, etc.

In an optional embodiment of the present disclosure, the heights of the microlenses 122 are 1 um to 100 um.

Specifically, by setting the heights of the microlenses 122 to be different, it is beneficial to generating a phase difference when the heights of the microlenses 122 are distributed within a certain range, so as to use the phase difference to solve the problems of uneven brightness, uneven color, etc. caused by diffraction, thereby improving the quality of light uniformity of the light beam. In a preferred embodiment of the present disclosure, the heights of the microlenses 122 are 1 um to 200 um, for example, the heights of the microlenses 122 can be set to 1 um, 50 um, 100 um or 200 um, etc.

As shown in FIGS. 2 and 3, in an optional embodiment of the present disclosure, when the array microlens layer 120 and the Fresnel lens layer 130 are stacked on the transparent substrate 110, the difference between the refractive index $n_1$ of the array microlens layer 120 and the refractive index $n_2$ of the Fresnel lens layer 130 satisfies $|n_1-n_2|\geq0.2$.

Specifically, the material forming the array microlens layer 120 may have a relatively high refractive index, and the material forming the Fresnel lens layer 130 may have a relatively low refractive index. It is also possible that the material forming the array microlens layer 120 has a relatively low refractive index, and the material forming the Fresnel lens layer 130 has a relatively high refractive index, which is not specifically limited in the embodiments of the present disclosure. When $|n_1-n_2|\geq0.2$, it is beneficial to ensuring better optical performance. It should be noted that different refractive indices are used to ensure the stability of the optical characteristics of the array microlens layer 120 and the Fresnel lens layer 130. If materials with the same refractive index are used, it can be considered that the array microlens layer 120 and the Fresnel lens layer 130 form the same structure, and they no longer have their own optical properties, so the refractive indices of the array microlens layer 120 and the Fresnel lens layer 130 need to be different.

Figure 4:
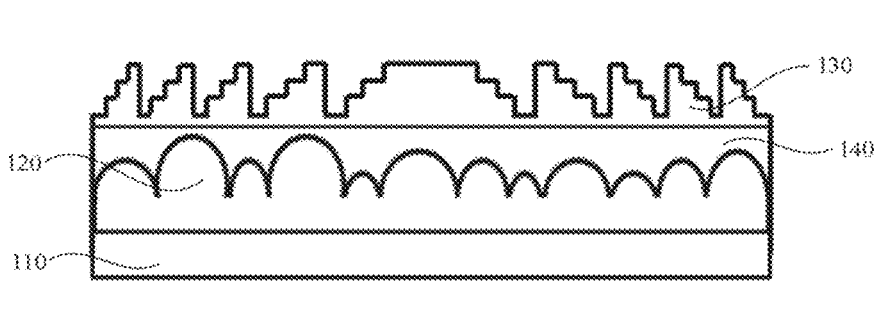
FIG. 4 is a fourth structural schematic diagram of an optical element provided by an embodiment of the present disclosure.

As shown in FIG. 4, in an optional embodiment of the present disclosure, a spacer layer 140 is further provided between the array microlens layer 120 and the Fresnel lens layer 130. At this time, the difference between the refractive index $n_1$ of the array microlens layer 120 and the refractive index $n_3$ of the spacer layer 140 satisfies $|n_1-n_3|\geq0.2$, and the difference between the refractive index $n_2$ of the Fresnel lens layer 130 and the refractive index $n_3$ of the spacer layer 140 satisfies $|n_2-n_3|\geq0.2$.

It can be understood that adopting different refractive indices is to ensure the stability of the optical characteristics of the array microlens layer 120 and the Fresnel lens layer 130. When a spacer layer 140 is further provided between the array microlens layer 120 and the Fresnel lens layer 130, the refractive indices of the array microlens layer 120 and the Fresnel lens layer 130 may be the same or different, which is not specifically limited in the embodiments of the present disclosure.

As shown in FIG. 2, the Fresnel lens layer 130 includes a stepped Fresnel structure, and the height $h_1$ of the stepped Fresnel structure is 0.1 um to 10 um.

Specifically, when a stepped Fresnel structure is adopted, a multi-step structure such as 2-step, 4-step, or 8-step can be adopted, and the height of each step is generally equal, or the structure can provided with non-equal heights as required. In specific applications, it can be set flexibly as required, that is, the height $h_1$ of the stepped Fresnel structure can be set to 0.1 um, 0.5 um, 4 um or 10 um, etc. as actually required.

As shown in FIG. 1, the Fresnel lens layer 130 includes a continuous Fresnel structure, and the height $h_2$ of the continuous Fresnel structure is 1 um to 100 um.

Specifically, the continuous Fresnel structure can be made up of multiple segments segmented from a spherical surface, an aspherical surface, etc., or multiple segments segmented from a free-form surface. The sawtooth height of the continuous Finney structure can be equal or non-equal, which can be set flexibly as required. For example, the height $h_2$ of the continuous Fresnel structure can be set to 1 um, 10 um, 20 um, 50 um or 100 um, etc.

Figure 6:
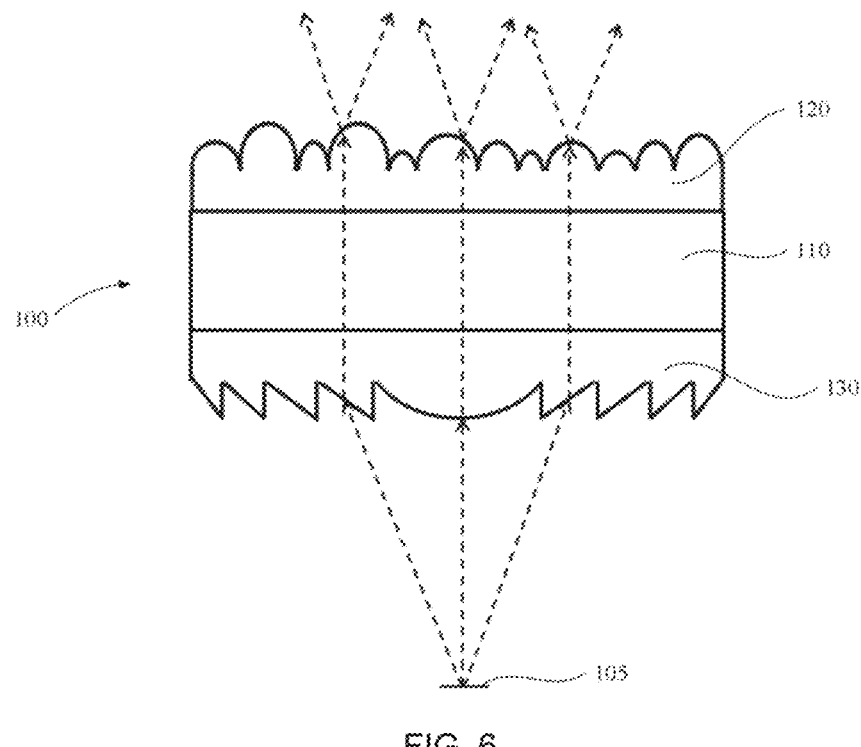
FIG. 6 is a first schematic diagram of light beam transmitted through an optical element provided by an embodiment of the present disclosure.

FIG. 6 is a schematic diagram showing that the light beam passes through the Fresnel lens layer 130 and then is emerged in parallel (that is, the light beam is collimated) in an embodiment of the present disclosure. In practical application, the optical element 100 of the present disclosure makes the light source 105 face the Fresnel lens layer 130, wherein the light source 105 can be any one of a light emitting diode (LED), a semiconductor laser diode (LD), and a vertical cavity surface emitting laser (VCSEL). By adopting the above forms, the light beam is collimated by the Fresnel lens layer 130, then shaped and homogenized by the array microlens layer 120, and then emerged. The Fresnel lens layer 130 can adopt a stepped Fresnel structure or a continuous Fresnel structure.

Figure 7:
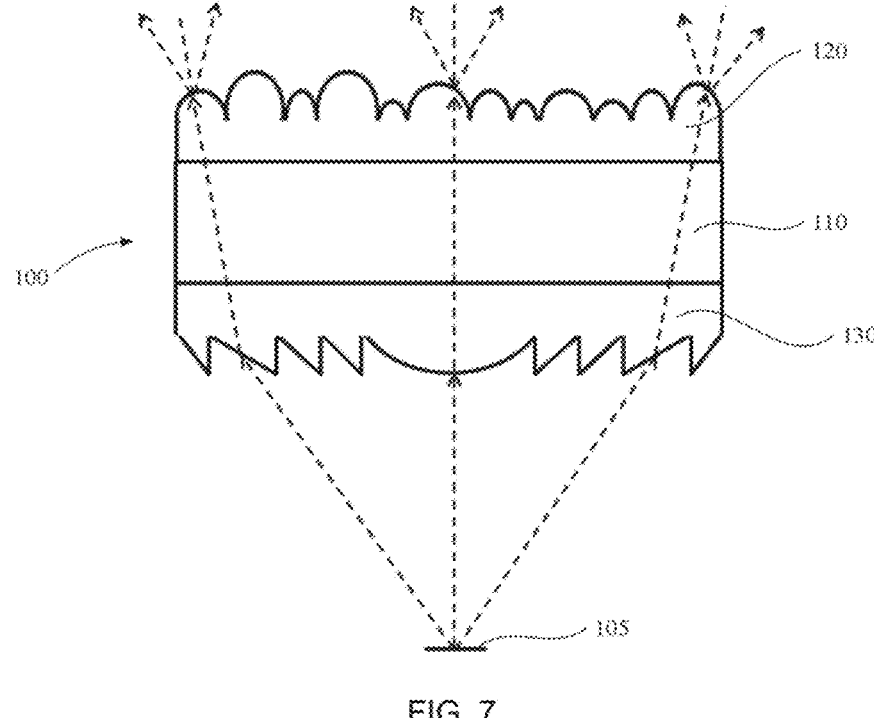
FIG. 7 is a second schematic diagram of light beam transmitted through an optical element provided by an embodiment of the present disclosure.

FIG. 7 is a schematic diagram shows that after the light beam passes through the Fresnel lens layer 130, the emergent angle is adjusted as required in the embodiment of the present disclosure. In this form, after the light is emitted from the light source 105 to the Fresnel lens layer 130, the direction of the light beam is adjusted by the Fresnel lens layer 130, then the light beam is shaped and homogenized by the array microlens layer 120, and then emerged, so as to implement various adjustment forms of the light beam.

It can be seen from the structural form and light beam propagation form of the optical element 100 in FIGS. 6 and 7 that the Fresnel lens layer 130 of the present disclosure can not only function as collimating, but also flexibly adjusting the direction of the light beam. When it is required to adjust the direction of the light beam, the refracted light is no longer emerged in parallel through the refraction of the Fresnel lens layer 130, but the angles of the refracted light are different at different positions, and then it is diffused through the array microlens layer 120, so that the main light angles of the emergent light in different fields of view are different. In practical application, the direction of the emergent light can be flexibly adjusted according to the requirements of the subsequent optical system. When adjusting the direction of the light beam, the incident light angles at different positions of the optical element 100 and the required emergent light angles at different positions can be determined first, wherein a whole free-form surface can be solved by using the solution method of free-form surface, and then the surface can be segmented into a multi-segment Fresnel lens layer 130. It is also possible that the incident angles and emergent angles at different positions are determined first, and then the structural form of the Fresnel structure at each position is directly adjusted, so as to implement flexible regulation of incident light beam.

Figure 8:
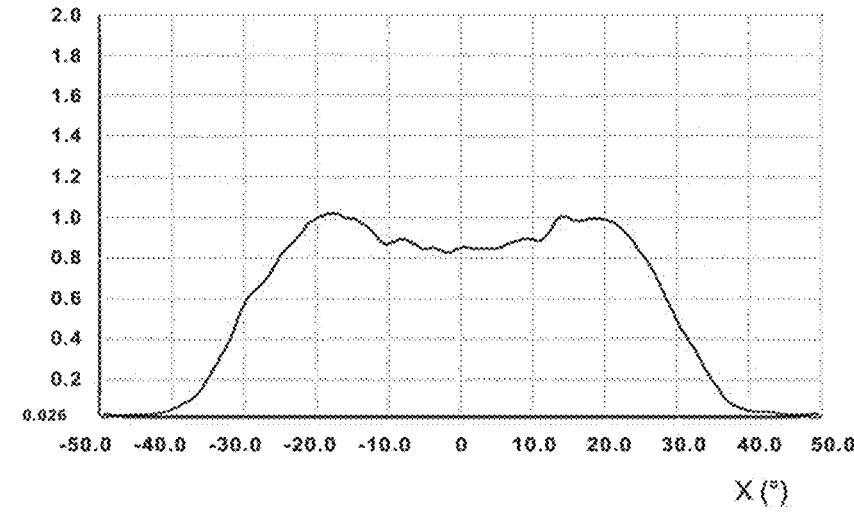
FIG. 8 is a cross-sectional distribution diagram of a light spot passing through a conventional lens group provided by an embodiment of the present disclosure.
Figure 9:
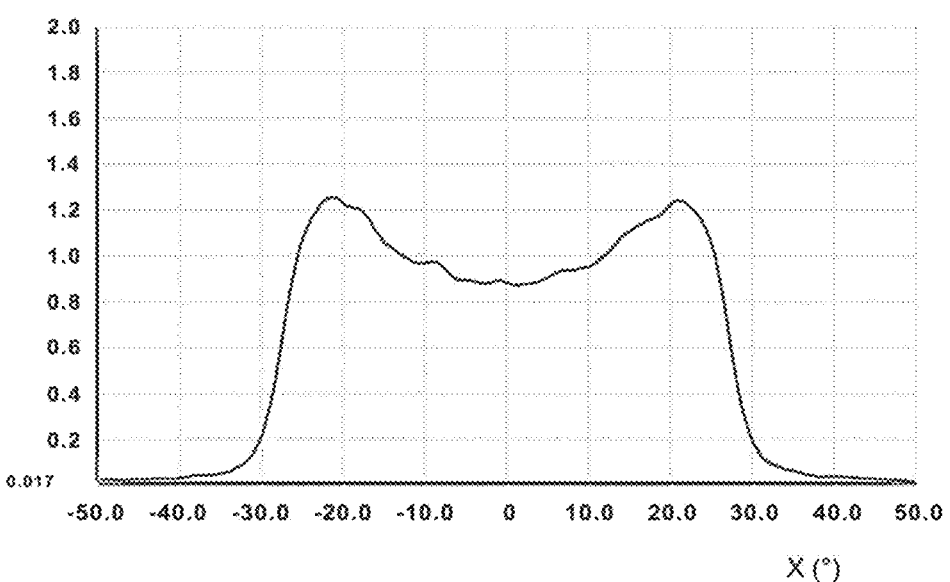
FIG. 9 is a cross-sectional distribution diagram of a light spot passing through an optical element provided by an embodiment of the present disclosure.

For example, when a conventional lens group (in the form that the light source 105 cooperates with the microlens array) is used for testing, it is assumed that the divergence angle of the light source 105 is ±13°, the light emitting area of the light source 105 is 100 μm×100 μm, and the distance between the light source 105 and the microlens array is 0.9 mm, and the measured cross-sectional distribution of the light spot is shown in FIG. 8. When the optical element 100 of the present disclosure is used for testing, the above light source 105 is also used for testing, and the focal length of the Fresnel lens is set to 0.9 mm, and at this time, the cross-sectional distribution of the measured light spot is shown in FIG. 9. According to the comparison between FIGS. 8 and 9, the optical element 100 of the present disclosure can make the edge of the emergent light spot sharper, the window efficiency higher, and the light uniformity effect better without additional elements.

In an optional embodiment of the present disclosure, materials of the transparent substrate 110, the array microlens layer 120, and the Fresnel lens layer 130 include any one of glass, resin, or plastic.

Specifically, the transparent substrate 110, the array microlens layer 120, and the Fresnel lens layer 130 are transparent materials in application wave band. In this way, when light with different wave bands is emerged from the light source 105, the transparency of the transparent substrate 110, the array microlens layer 120, and the Fresnel lens layer 130 is matched with the wave bands, which is beneficial to improving the utilization rate of light.

In addition, the transparent substrate 110 in the embodiment of the present disclosure mainly functions as bearing and supporting, and the thickness of the transparent substrate 110 is 0.1 mm to 5 mm. For example, the thickness of the transparent substrate 110 can be set to 0.1 mm, 1 mm, 3 mm, or 5 mm, etc.

Figure 10:
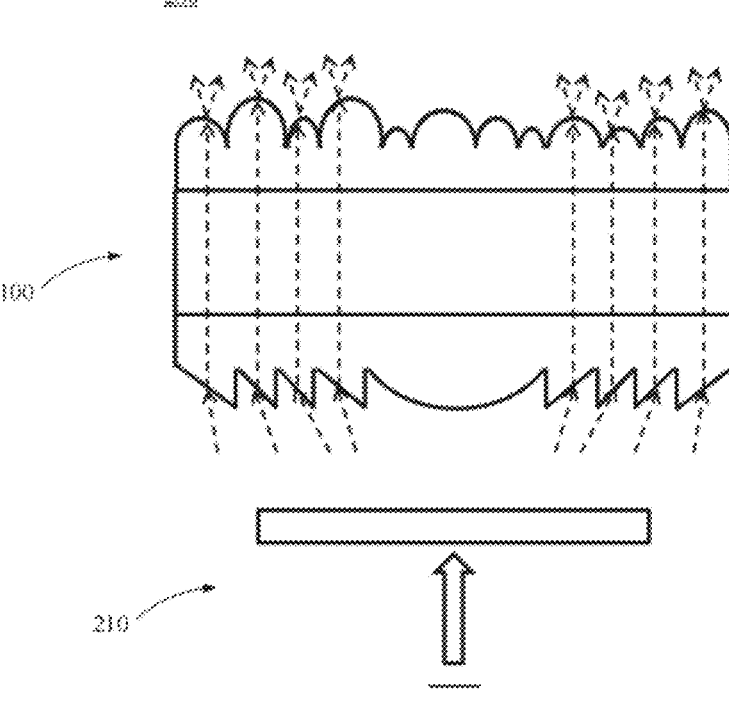
FIG. 10 is a structural schematic diagram of an optical module provided by an embodiment of the present disclosure.

As shown in FIG. 10, the embodiment of the present disclosure further discloses an optical module 200, which includes the optical element 100 in the aforementioned embodiments and a light emitting module 210, and the optical element 100 is located on the emergent light path of the light emitting module 210. The optical module 200 has the same structure and beneficial effects as the optical element 100 in the aforementioned embodiments. The structure and beneficial effects of the optical element 100 have been described in detail in the aforementioned embodiments, and will not be repeated here.

It should be noted that the light emitting module 210 in the embodiment of the present disclosure can be a single light source, or a module composed of a light source and a lens, a mirror or an aperture, etc., so as to meet the present disclosure requirements of different scenes.

The above are only the preferred embodiments of the present disclosure, and are not intended to limit the present disclosure. For a person skilled in the art, various modifications and changes may be made to the present disclosure. Any modification, equivalent replacement, improvement, etc. made within the spirit and principles of the present disclosure shall fall within the scope of protection of the present disclosure.

INDUSTRIAL PRACTICABILITY

The present disclosure discloses an optical element and an optical module. The optical element includes a transparent substrate, an array microlens layer, and a Fresnel lens layer, the array microlens layer and the Fresnel lens layer being stacked on the transparent substrate, or the array microlens layer and the Fresnel lens layer being respectively located at two opposite sides of the transparent substrate, wherein the Fresnel lens layer is configured for adjusting an emergent angle of an incident light beam, and the random array microlens layer is configured for homogenizing the light beam emerged from the Fresnel lens layer. The light beam direction and light intensity distribution can be adjusted, and the occupied space can be reduced.

In addition, it can be understood that the optical element and the optical module of the present disclosure are reproducible, and can be used in various industrial applications. For example, the optical element and the optical module can be used in the field of optical technology.

What is claimed is:

1. An optical element, comprising a transparent substrate, an array microlens layer, and a Fresnel lens layer, wherein the array microlens layer and the Fresnel lens layer are stacked on a same side of the transparent substrate, wherein a difference between a refractive index n1 of the array microlens layer and a refractive index n2 of the Fresnel lens layer satisfies $|n1-n2| \geq 0.2$, wherein a spacer layer is further arranged between the array microlens layer and the Fresnel lens layer, a difference between the refractive index n1 of the array microlens layer and a refractive index n3 of the spacer layer satisfies $|n1-n3| \geq 0.2$, and a difference between the refractive index n2 of the Fresnel lens layer and the refractive index n3 of the spacer layer satisfies $|n2-n3| \geq 0.2$, such that the Fresnel lens layer adjusts an emergent angle of an incident light beam, and the array microlens layer homogenizes the light beam emerged from the Fresnel lens layer.

2. The optical element according to claim 1, wherein the array microlens layer is implemented by combining laser direct writing and embossing, or the array microlens layer is implemented by combining mask lithography and melting.

3. The optical element according to claim 2, wherein the Fresnel lens layer is made by combining mask lithography and etching, or by combining mask lithography and embossing, or by combining laser direct writing and embossing.

4. The optical element according claim 2, wherein the array microlens layer comprises microlenses distributed along a same plane, and the microlenses at different positions have different shapes and sizes.

5. The optical element according to claim 1, wherein the Fresnel lens layer is made by combining mask lithography and etching, or by combining mask lithography and embossing, or by combining laser direct writing and embossing.

6. The optical element according claim 5, wherein the array microlens layer comprises microlenses distributed along a same plane, and the microlenses at different positions have different shapes and sizes.

7. The optical element according to claim 1, wherein the array microlens layer comprises microlenses distributed along a same plane, and the microlenses at different positions have different shapes and sizes.

8. The optical element according to claim 7, wherein a light transmission surface of the microlens comprises any one of a concave surface, a convex surface, or a wavy curved surface.

9. The optical element according to claim 8, wherein adjacent microlenses are attached to each other, and a spacing between geometric centers of the adjacent microlenses is 1 μm to 200 um.

10. The optical element according to claim 8, wherein a height of the microlens is 1 μm to 100 um.

11. The optical element according to claim 7, wherein adjacent microlenses are attached to each other, and a spacing between geometric centers of the adjacent microlenses is 1 μm to 200 um.

12. The optical element according to claim 11, wherein a height of the microlens is 1 μm to 100 um.

13. The optical element according to claim 7, wherein a height of the microlens is 1 μm to 100 um.

14. The optical element according to claim 1, wherein the Fresnel lens layer comprises a stepped Fresnel structure with a height $h_1$ of 0.1 um to 10 um, or the Fresnel lens layer comprises a continuous Fresnel structure with a height $h_2$ of 1 um to 100 um.

15. The optical element according to claim 1, wherein materials of the transparent substrate, the array microlens layer, and the Fresnel lens layer comprise any one of glass, resin, or plastic.

16. The optical element according to claim 1, wherein a thickness of the transparent substrate is 0.1 mm to 5 mm.

17. An optical module, comprising the optical element according to claim 1, and a light emitting module, wherein the optical element is located on an emergent light path of the light emitting module.

18. The optical element according to claim 17, wherein the light emitting module is a single light source, or the light emitting module is a module consisting of: a light source; and a lens, a mirror, or an aperture.

\* \* \* \* \*